(12) United States Patent
Steger et al.

(10) Patent No.: US 7,544,729 B2
(45) Date of Patent: Jun. 9, 2009

(54) PROCESS FOR PRODUCING RUBBER MIXTURES

(75) Inventors: Lothar Steger, München (DE); Thomas Früh, Limburgerhof (DE); Ludger Heiliger, Neustadt (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 11/135,038

(22) Filed: May 23, 2005

(65) Prior Publication Data

US 2005/0267247 A1 Dec. 1, 2005

(30) Foreign Application Priority Data

May 26, 2004 (DE) .................. 10 2004 026 317

(51) Int. Cl.
*C07F 9/165* (2006.01)
*C08F 36/00* (2006.01)

(52) U.S. Cl. .................. 524/146; 524/147; 524/148; 524/83; 524/84; 524/95; 524/104; 524/236; 524/392; 524/393; 524/399; 524/492; 524/267; 525/331.9; 525/332.6

(58) Field of Classification Search .............. 525/332.6, 525/331.9, 332.7, 332.1; 524/95, 87, 83, 524/84, 146, 392, 393, 236, 147, 148, 331.9
See application file for complete search history.

(56) References Cited

U.S. PATENT DOCUMENTS

| | | | | |
|---|---|---|---|---|
| 3,697,433 A * | 10/1972 | Schubart et al. | .............. | 502/167 |
| 4,306,992 A * | 12/1981 | Schubart et al. | .............. | 502/167 |
| 4,435,532 A * | 3/1984 | Thormer et al. | ............... | 524/92 |
| 5,830,817 A | 11/1998 | Graf et al. | .................... | 502/167 |
| 5,939,493 A | 8/1999 | Hojo | ........................ | 525/332.6 |
| 6,186,204 B1 | 2/2001 | Sasaka et al. | ................ | 152/450 |
| 6,197,868 B1 * | 3/2001 | Okamura et al. | ............ | 524/492 |
| 6,242,522 B1 * | 6/2001 | Ezawa et al. | ................. | 524/437 |
| 6,334,476 B1 | 1/2002 | Okamura et al. | ............ | 152/525 |
| 6,336,486 B1 * | 1/2002 | Iwasaki et al. | ........... | 152/209.4 |
| 6,536,492 B2 | 3/2003 | Vasseur | ....................... | 152/450 |
| 6,620,871 B2 * | 9/2003 | Wilson, III | .................. | 524/398 |
| 6,797,780 B2 * | 9/2004 | Obrecht et al. | .............. | 525/194 |
| 2001/0034389 A1 | 10/2001 | Vasseur | ...................... | 524/137 |
| 2003/0212185 A1 * | 11/2003 | Vasseur | ...................... | 524/492 |

FOREIGN PATENT DOCUMENTS

| | | | | |
|---|---|---|---|---|
| DE | 2 053 574 | | * | 5/1972 |
| EP | 692 518 A1 | | * | 1/1996 |
| EP | 767 205 A1 | | * | 4/1997 |
| EP | 896 888 A2 | | * | 2/1999 |
| EP | 945 488 A2 | | * | 9/1999 |
| GB | 1 288 616 | | * | 9/1972 |
| JP | 42-16401 | | * | 5/1967 |
| JP | 06-256572 | | * | 9/1994 |
| JP | 9-111040 | | * | 4/1997 |
| JP | 11-279331 | | * | 10/1999 |
| JP | 2000-289407 | A | * | 10/2000 |
| JP | 2002-220502 | A | * | 8/2002 |

OTHER PUBLICATIONS

KR 2003-17679; Mar. 3, 2003 (abstract).
Helfried Ehrend, "Uber die Wirkung von Thiophosphaten in Vernetzungssystemen von Dienkautschuke" Gummi, Asbest und Kunststoffe 1977, 30, 68 to 71.
S. Wolff. et al., Silica-Based Tread Compounds: Background and Performance, presented at the Tiretech Conference 1993.
Eholzer U et al: "Verbesserung Der Reversionsbestaendigkeit Durch Nachvernetzende Beschleunigungssysteme. Improvement of Reversion Resistance With Post-Crosslinking Accelerator Systems" Kautschuk Und Gummi—Kunststoffe, Huthig, Heidelberg, DE, Bd. 38, Nr. 8, 1985, Seiten 710-720, XP002070810 ISSN: 0948-3276 das ganze Dokument.
Van Raepenbusch P. et al.: "On the Depending of Tire Performance and the Degree of Mixing" Kautschuk Gummi Kunststoffe, Bd. 56, Nr. 3, 2003, Seiten 110-113, XP001207026 das ganze Dokument.

* cited by examiner

*Primary Examiner*—Vasu Jagannathan
*Assistant Examiner*—Rip A. Lee
(74) *Attorney, Agent, or Firm*—Nicanor A. Kohncke

(57) ABSTRACT

The present invention relates to a process for producing rubber mixtures, to the rubber mixtures obtainable by the process, to the use of rubber mixtures for producing tires or semi-finished products for tires and crosslinked elastomer molded articles which are obtained by vulcanization of the rubber mixtures produced according to the present invention.

18 Claims, No Drawings

PROCESS FOR PRODUCING RUBBER MIXTURES

FIELD OF THE INVENTION

The present invention relates to a process for producing rubber mixtures, to the rubber mixtures obtainable by the process, to the use of the rubber mixtures for producing tires or semi-finished products for tires and crosslinked elastomer molded articles which are obtained by vulcanization of the rubber mixtures produced according to the invention.

BACKGROUND OF THE INVENTION

Dithiophosphates have long been known as vulcanization accelerators for carbon black-filled diene rubbers (see for example Helfried Ehrend, "Über die Wirkung von Thiophosphaten in Vernetzungssystemen von Dienkautschuke" Gummi, Asbest und Kunststoffe 1977, 30, 68 to 71 and EP 0832920 (Bridgestone). The use of dithiophosphates as a vulcanization accelerator in activated silica-containing rubber mixtures is not described therein, however. All examples work with carbon black-filled rubber mixtures.

There are clear differences between carbon black and silica as a filler in rubber mixtures since light-colored fillers, such as silica, in contrast to carbon black, have a tendency to agglomerate in the polymer matrix. Carbon black and silica also exert different influences on a given vulcanization/acceleration system (see for example S. Wolff. et al., Silica-Based Tread Compounds: Background and Performance, presented at the Tiretech Conference 1993).

Silica-filled tire compositions are of particular interest as they lead to reduced rolling resistance without the adhesion and durability of the tires being impaired. The result is lower fuel consumption.

WO 00/05301 (EP 1102812 B1 and DE 69903563 T2 (Michelin)) describes the use of zinc dithiophosphates in combination with guanidine derivatives as the coupling activators in the activation of light-colored fillers with polysulphide-containing alkoxysilanes in order to thus considerably reduced the quantity of alkoxysilane used. However, the use of guanidine derivatives is disadvantageous in the presence of natural rubbers, which rubbers are used in particular in the production of winter tires, as a high temperatures they lead to destabilizatoin of the system (reversion, chain breakdown). Only sulphenamides are used as the vulcanization accelerator. Use of the zinc dithiophisphates as the vulcanization accelerator is not disclosed.

In the present invention, it was suprisingly discovered that the use of dithiophosphates as the vulcanization accelerator, in combination with at least one further vulcanization accelerator selected from a sulphenamide compound or a thiazole compound, lead to the formation of extremely reversion-stable silica-containing vulcanized rubber mixtures. The process is suitable in particular for solution SBR (S-SBR)-containing or S-SBR/NR-containing rubber mixtures. Compared with EP 1102812 the process does not require any coupling activators during filler activation and, in particular, no guanidine derivatives with a particularly damaging effect on NR-containing rubber mixtures need to be used. The process of the present invention is thus particularly suitable for producing reversion-stable NR-containing rubber mixtures which are suitable for producing winter tires. The process according to the present invention is also suitable for producing S-SBR/BR-containing silica-containing rubber mixtures which are particularly suitable as summer tires.

SUMMARY OF THE INVENTION

The present invention thus relates to a process for producing a rubber mixture which includes:
a) reacting at least one diene elastomer, at least one light-colored reinforcing filler and at least one polysulphide-containing alkoxysilane,
b) mixing the composition obtained with at least one vulcanizing agent, at least one dithiophosphate compound and at least one further vulcanization accelerator selected from a sulphenamide compound and a thiazole compound.

DETAILED DESCRIPTION

Step A) (Filler Activation or Coupling)
In step a) the light-colored filler is activated (coupled) with at least one polysulphide-containing alkoxysilane in the presence of the diene elastomer.

Light-Colored Filler
A light-colored filler according to the present invention includes a reinforcing filler.

A reinforcing filler according to the present invention is preferably a filler which on addition of 10 to 100% by weight causes an increase in the modulus of at least 100%.

According to the present invention one or more light-colored reinforcing fillers can be used. "Light-colored" according to the present invention excludes carbon black. According to the present invention it is equally possible to use carbon black in addition to the light-colored filler, such as carbon blacks of the HAF, ISAF and SAF types which are conventionally used in tires and, in particular, in tire treads. Examples of suitable carbon blacks include N 115, N134, N234, N339, N347 and N375.

The proportion of light-colored reinforcing filler is more than 50% by weight, however, and preferably more than 80% by weight, based on the total quantity of reinforcing filler used. The proportion of carbon black is preferably less than 50% by weight and more preferably less than 20% by weight. In one aspect of the present invention no carbon black is added in the process.

The light-colored reinforcing filler is preferably silica ($SiO_2$) or aluminum oxide ($Al_2O_3$) or mixtures thereof. The silica used can be any desired reinforcing silicas which are known to a person skilled in the art, such as any desired precipitated silicas or pyrogenic silicas with a BET surface area and a specific surface area determined with CTAB which are both less than 450 $m^2/g$, highly dispersible silicas precipitated, silicas being preferred, however, preferably when the present invention is used for producing tires with a low rolling resistance. Examples of preferred highly dispersible silicas include, for example, Perkasil KS 430 (AKZO), BV 3380 and Ultrasil7000 (Degussa), Zeosil 1165 MP and 1115 MP (Rhodia), Hi-Sil 2000 (PPG), Zeopol 8715, 8741 or 8745 (Huber) and treated precipitated silicas such as silicas "doped" with aluminum which are described in EP-A-0 735 088. One or more types of silica can be used. Aluminum oxide is also a highly-dispersible aluminum oxide as described in EP-A-0 810 258. Examples include: A 125 or CR125 (Baikowski), APA-1OORDX (Condea), Aluminumoxide C (Degussa) und AKP-GO 15 (Sumitomo Chemicals). The light-colored reinforcing filler can be in the form of powders, microbeads, granules or spheres. Preferable silicas and/or aluminum oxides are used. Silicas are more preferred.

The total content of light-colored reinforcing filler (and optionally carbon black) is preferably in the range of 20 to 300 parts by weight, more preferably 30 to 150 parts by weight and most preferably 50 to 130 parts by weight per 100 parts by weight of the diene elastomer. The optimum quantity depends on the type of light-colored filler used and the desired application; a bicycle tire requires a lower degree of reinforcement than a tire for private cars or commercial vehicles, such as HGVs.

Polysulphide-Containing Alkoxysilane (Coupling Agent)

The polysulphide-containing alkoxysilane used according to the present invention can be referred to as a coupling agent for incorporating the reinforcing filler into the elastomer matrix (see for example S. Wolff et al., Silica-Based Tread Compounds: Background and Performance, presented at the Tiretech Conference 1993). These carry two types of functional groups, the alkoxysilyl group which binds to the light-colored filler, and the sulphur-containing group which binds to the elastomer.

According to the present invention one or more of the polysulphide-containing alkoxysilanes can be used in combination.

The polysulphide alkoxysilanes are known to the person skilled in the art as coupling agents (light-colored filler/diene elastomer) in rubber mixtures which are provided for producing tires. Reference can be made in particular to patents U.S. Pat. Nos. 3,842,111, 3,873,489, 3,978,103 and 3,997,581, 5,580,919, 5,583,245, 5,663,396, 5,684,171, 5,684,172 and 5,696,197.

Symmetrical polysulphide-containing alkoxysilanes of the following formula are preferred:

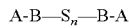

wherein n is an integer from 2 to 8; B is a divalent, optionally substituted hydrocarbon group and A is a group of formula

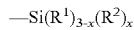

wherein x is 1 to 3 and $R^1$ is an optionally substituted alkyl group (preferably with 1 to 20 carbon atoms), a cycloalkyl group (preferably with 3 to 20 carbon atoms) or an aryl group (preferably with 6 to 20 carbon atoms), $R^2$ is an optionally substituted alkoxy group (preferably with 1 to 20 carbon atoms) or a cycloalkoxy group (preferably with 3 to 20 carbon atoms).

n is preferably an integer from 2 to 5. In conventional commercial polysulphide-containing alkoxysilanes, as is known to the person skilled in the art, there is conventionally a mixture of polysulphide-containing alkoxysilanes with different values of "n". The mean value for "n" in these mixtures is in the range of 2 to 6, preferably 3 to 5 and more preferably about 4. In one aspect of the present invention, the value of n can also be 2.

The above-mentioned divalent, optionally substituted hydrocarbon group B is a saturated or unsaturated hydrocarbon group with 1 to 18 carbon atoms, preferably a $C_1$ to $C_{18}$ alkylene group (or alkane diyl group) or $C_6$ to $C_{10}$ arylene group, more preferably $C_1$ to $C_{10}$ alkylene groups, most preferable $C_2$ to $C_4$ alkylene groups and more preferably propylene (propane-1,3-diyl).

The groups $R^1$ are preferably $C_1$ to $C_6$ alkyl groups, cyclohexyl or phenyl, more preferably $C_1$ to $C_4$ alkyl groups and most preferably methyl and/or ethyl.

The groups $R^2$ are preferably $C_1$ to $C_8$ alkoxy groups or $C_5$ to $C_8$ cycloalkoxy groups and more preferably methoxy and/or ethoxy, With respect to these polysulphide-containing alkoxysilanes and processes for their production, reference can be made, for example, to U.S. Pat. Nos. 5,684,171 and 5,684,172.

The polysulphide-containing alkoxysilane used according to the present invention is a polysulphide, preferably a disulphide or a tetrasulphide of a bis($C_1$ to $C_4$) alkoxy-[and optionally ($C_1$ to $C_4$)]alkyl]silylpropyls, more preferably bis($C_1$ to $C_4$)-trialkoxysilylpropyl and most preferably bis(3-triethoxysilyipropyl) or bis(3-trimethoxysilylpropyl). The disulphide of bis(triethoxysilylpropyl) or TESPD of formula $[(C_2H_5O)_3Si(CH_2)_3S]_2$ is, for example, commercially available from Degussa under the names Si266 or Si75 (the latter in the form of a mixture of disulphide (75% by weight) and polysulphide) or from Witco under the name Silquest A1589. The tetrasulphide of bis(triethoxysilylpropyl) or TESPT of formula $[(C_2H_5O)_3Si(CH_2)_3S_2]_2$ is available, for example, from Degussa under the name Si69 (or X50S with 50% by weight carbon black as the carrier) or from Witco under the name Silquest A1289 (in each case a commercial mixture with a mean value of n of approx. four (4). According to the present invention TESPT (Si69) is particularly preferably used. In the rubber mixtures produced according to the present invention the polysulphide-containing alkoxysilane content can be in the range of 0.5 to 15% by weight, based on the total weight of the light-colored reinforcing filler. According to the present invention it is also possible to use at least one coupling activator during filler activation. According to the present invention this is less preferred, however.

The polysulphide-containing alkoxysilane can be coupled in advance to the diene elastomer by way of the sulphur-containing functional group, the alkoxysilyl-containing group remaining on the light-colored reinforcing filler for coupling. The polysulphide-containing alkoxysilane can also be coupled in advance by way of the alkoxysilyl-containing group to the light-colored reinforcing filler, wherein the filler pre-coupled in this way can then be coupled by way of the sulphide-containing group to the diene elastomer. However, to improve the processability of the compositions in the unvulcanized state, the coupling agent is preferably either bound to the light-colored reinforcing filler and subsequently, after it has been bound to the filler, mixed with the diene elastomer or mixed in the unreacted state with the filler and the diene elastomer.

Filler activation can proceed as stated above in one stage (addition of filler, diene elastomer and alkoxysilane in one go) or in two stages (1. addition of alkoxysilane and filler or diene elastomer, preferably filler and 2. addition of the components still missing (filler or diene elastomer).

Diene Elastomer

Diene elastomers are herein taken to mean elastomers which are homopolymers or copolymers (of two or more monomers) and diene monomers (monomers which comprise two carbon-carbon double bonds which are in conjugated on non-conjugated form). Diene elastomers of this type include, for example:

(a) homopolymers which are produced by polymerization of a conjugated diene monomer with 4 to 12 carbon atoms;

(b) copolymers which are produced by copolymerization of one or more conjugated diene(s) with each other and/or with one or more aromatic vinyl compound(s) with 8 to 20 carbon atoms;

(c) ternary copolymers which are produced by copolymerization of ethylene, an α-olefin with 3 to 6 carbon atoms and a non-conjugated diene monomer with 6 to 12 carbon atoms, for example elastomers, which are produced starting from ethylene, propylene and a non-conjugated diene monomer of the aforementioned type, preferably 1,4 hexadiene, norbornene ethylidene and dicylcopentadiene;

(d) copolymers of isobutene and isoprene (butyl rubber) and halogenated, in particular chlorinated or brominated, types of these copolymers.

In principle, all types of diene elastomers can be used according to the present invention. However, for use in tires or tire treads substantially unsaturated diene elastomers, in particular elastomers of the above-mentioned type (a) or (b) with a conjugated diene unit content of preferably at least 50mol % are particularly suitable.

Suitable conjugated dienes include 1,3-butadiene, 2-methyl-1,3-butadiene, 2,3-di($C_1$ to $C_5$ alkyl)-1,3-butadiene, for example, 2,3-dimethyl-1,3-butadiene, 2,3-diethyl-1,3-butadiene, 2-methyl-3-ethyl-1,3-butadiene and 2-methyl-3-isopropyl-1,3-butadiene, aryl-1,3-butadiene, 1,3-pentadiene and 2,4-hexadiene.

Suitable aromatic vinyl compounds include, for example, styrene, ortho-, meta- and para-methylstyrene, a conventional commercial "vinyl toluene" mixture, para-t-butyl styrene, methoxystyrene, chlorostyrene, vinyl mesitylene, divinyl benzene and vinyl naphthalene.

The copolymers can preferably contain 99 to 20% by weight diene units and 1 to 80% by weight vinylaromatic units. The elastomers can contain any desired microstructures which depend on the polymerization conditions adhered to, in particular the presence or absence of a modifying agent and/or randomizing agent and the quantities of modifying agent and/or randomizing agent used. The elastomers can, for example, be block polymers, random polymers, sequential polymers or microsequential polymers. They can be produced in dispersion or in solution. They can be coupled and/or grafted to a coupling agent and/or to a grafting agent or means for functionalization or be branched in a star shape or functionalized.

The following are preferred: polybutadienes, preferably polybutadienes with a content of 1,2-linked units in the range of 4 to 80% or polybutadienes with more than 80% cis-1,4-linked units, polyisoprenes, butadiene-styrene copolymers, preferably copolymers with a styrene content of 5 to 50% by weight, more preferably 20 to 40% by weight, preferably with a content of butadiene units with 1,2-linkages in the range of 4 to 65% and preferably a content of trans-1,4-linked bonds in the range of 20 to 80%, butadiene-isoprene copolymers, preferably copolymers with an isoprene content in the range of 5 to 90% by weight and a glass transition temperature (Tg) of −40 to −80° C. and isoprene-styrene copolymers, preferably copolymers with a styrene content of 5 to 50% by weight and a Tg in the range of 25 to −50° C.

Suitable butadiene-styrene-isoprene copolymers include, copolymers of the type which have a styrene content of 5 to 50% by weight and, preferably 10 to 40%, an isoprene content of 15 to 60% by weight and, preferably 20 to 50%, a butadiene content of 5 to 50% by weight and, preferably, 20 to 40% by weight, a content of 1,2-linked butadiene units of 4 to 85%, a content of trans-1,4-linked butadiene units of 6 to 80%, a content of 1,2- and 3,4-linked isoprene units in the range of 5 to 70% and a content of trans-1,4-linked isoprene units in the range of 10 to 50%, and also any desired butadiene-styrene-isoprene copolymers with a Tg in the range of −20 to −70° C.

The diene elastomer is preferably selected from polybutadienes (BR), polyisoprenes (IR), natural rubber (NR), butadiene-styrene copolymers (SBR), butadiene-isoprene copolymers (BIR), isoprene-styrene copolymers (SIR), butadiene-styrene-isoprene copolymers (SBIR) or the mixtures of two or more of these compounds.

More preferred are S-SBR, S-SBR/NR, S-SBR/NR/BR, S-SBR/BR.

The composition produced according to the present invention is preferably useful for tire treads. In this case the diene elastomer is preferably a butadiene-styrene copolymer (SBR), which is optionally used in a mixture with polybutadiene (BR) and/or natural rubber (NR).

Even more preferably the diene elastomer is a S-SBR (solvent styrene-butadiene rubber) which is produced in solution with a styrene content of 20 to 30% by weight, a vinyl bond content of the butadiene fraction in the range of 15 to 65%, a content of trans-1,4-linkages in the range of 15 to 75% and a glass transition temperature of −20 to −55° C., wherein this butadiene-styrene copolymer can optionally be used in a mixture with a polybutadiene and/or natural rubber, wherein the polybutadiene can preferably contain more than 90% cis-1,4-linkages.

The compositions produced according to the present invention can contain one or more diene elastomers. In addition, any desired synthetic elastomers, which are different from diene elastomers, and are non-elastomers, such as thermoplastic polymers, can be added.

The filler activation according to step a) of the process of the present invention must expediently be carried out at elevated temperature. According to the present invention during step a), a temperature of expediently at least 130° C. must be attained at some point during the reaction of the components in order to achieve an adequate reaction (filler activation). A temperature of at least 140° C. is preferably attained, even more preferably a temperature of at least 150° C. The maximum temperature is expediently about 160° C., more preferably about 170° C.

The temperature is in the process expediently measured in the mixer by suitable thermometers.

The step of filler activation a) can also be implemented in multiple stages with one or more cooling steps between heating.

The duration of filler activation depends on the selected temperature, the type of components selected and the type of mixer selected. Filler activation expediently takes place in the one-stage process over a period of 30 seconds to 30 minutes.

Filler activation is carried out using conventional mixers, such as rubber kneaders.

Step B) (Addition and Mixing of the Vulcanizing Agent and the Vulcanization Accelerator)

After step a), filler activation, the composition obtained in step a) is left to cool to a temperature which is sufficient to avoid, to an appreciable degree, vulcanization as a result of the addition of the vulcanizing agent and the vulcanization accelerator in step b). After addition of the vulcanizing agent and the vulcanization accelerator, the composition must preferably still be moldable. A temperature of less than about 120° C. is usually sufficient for this purpose. The composition is preferably left to cool to less than 100° C., more preferably to less than 80° C., even more preferably to less than 60° C. before the vulcanization system, containing the vulcanizing agent and the vulcanization accelerators, is added or mixed in. Mixing-in takes place in a manner known per se, for example in a conventional mixer, such as a rubber kneader.

The sequence of addition of the vulcanizing agent and the vulcanization accelerators is arbitrary per se.

The mixing duration can last, for example, for 1 to 30 minutes, preferably 3 to 5 minutes.

According to the present invention, any desired vulcanizing agents per se can be used. Examples of the vulcanizing agent include sulphur and sulphur donors which can be added in a quantity, based on sulphur, of 0.5 to 5.0 parts by weight, preferably 1 to 2 parts by weight, to 100 parts by weight of the diene elastomer. If the quantity is less than 0.5 parts by weight, the breaking strength and the abrasion resistance of the vulcanized rubber decrease. If the quantity exceeds 5 parts by weight, there is a tendency for the elasticity of the rubber to deteriorate. The preferred vulcanizing agent is elemental sulphur. Suitable vulcanizing agents are listed, for example, in Chapter 4, "Curing Agents" in the Rubber Handbook, $9^{th}$ edition, 1996.

In step b) of the process according to the present invention, at least one dithiophosphate compound is added as the vulcanization accelerator. Dithiophosphate compounds as the vulcanization accelerators are known per se from carbon black-filled systems (for example Helfried Ehrend, "Über die Wirkung von Thiophosphaten in Vernetzungssystemen von Dienkautschuke" Gummi, Asbest und Kunststoffe 1977, 30, 68 to 71 and EP 0832920 (Bridgestone)). According to the present invention they are preferably selected from compounds of formula

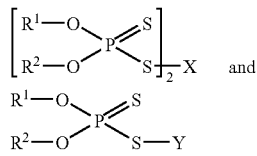

wherein $R^1$ and $R^2$, respectively independently of each other, are an optionally substituted $C_1$ to $C_{10}$ alkyl group and/or an optionally substituted $C_6$ to $C_{10}$ aryl group, X is a bifunctional radical and Y a monofunctional radical which each comprise at least one element that is different from carbon. The bond line in the above formulae between the S atom and the radicals X and Y can embody a covalent to ionic bond. In the ionic bond the S atom carries a negative charge.

Difunctional radicals X are preferably selected from divalent metals, such as Zn, Cu, etc. or difunctional polysulphide radicals —$(S)_y$—, wherein y is 1 to 8, preferably 2 to 6, and can be a mean value. Preferred are divalent metals in which the bond to the S atom tends to have an ionic character. Zinc is more preferred. Free coordination points on the metal can be occupied by Lewis bases, such as amines or ethers.

Monofunctional radicals Y can be monovalent metals (metal ions) or ammonium radicals. The monofunctional radicals Y are preferably ammonium radicals, such as $NH_{4-z}(R)_z^+$, wherein R is an organic group, etc.

The dithiophosphate compound is preferably a zinc dithiophosphate compound (also abbreviated to "DPTZn") of the following formula:

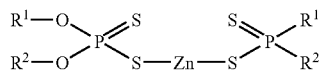

wherein in the groups $R^1$ and $R^2$ may be the same or different, are preferably the same, and are as defined above. The groups $R^1$ and $R^2$ are preferably straight chain or branched, substituted or unsubstituted alkyl groups or cycloalkyl groups with up to 10 carbon atoms, preferably $C_2$ to $C_8$ alkyl groups or $C_5$ to $C_{10}$ cycloalkyl groups. Preferred alkyl groups can, in particular, be ethyl, n-propyl, isopropyl, n-butyl, isobutyl and cyclohexyl and primarily the $C_2$ to $C_4$ alkyl groups. $R^1$ and $R^2$ are more preferably n-propyl or isopropyl. Examples of DTPZn can, for example, include the zinc dialkyl dithiophosphates which are available from Rhein Chemie Rheinau GmbH (Germany) under the names Rhenocure TP/G and TP/S, the product that is commercially available from Monsanto under the name Vocol S (dibutyl dithiophosphate), or the products that are described in EP-A-0832920, EP-A-692 518 or CA-A-2 153 509. Further suitable dithiophosphate compounds are listed in Chapter 5 "Accelerators" in the Rubber Handbook, $9^{th}$ edition, 1996.

The person skilled in the art can select the optimum quantity of dithiophosphate compound as a function of the desired application, the selected diene elastomer, and the quantity of vulcanizing agent, etc. The quantity is preferably 0.2 to 5 parts by weight, preferably 0.25 to 3 parts by weight, more preferably 0.5 to 1.5 parts by weight, based on 100 parts by weight of the diene elastomer.

According to the present invention at least one sulphenamide compound and/or thiazole compound, preferably at least one sulphenamide compound in combination with the dithiophospate compound, is used as the vulcanization accelerator. Sulphenamide compounds of this type conventionally contain the structural element

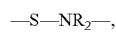

wherein R is hydrogen or an organic radical.

Preferred sulphenamides have the structure

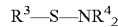

wherein $R^1$ is preferably optionally substituted heteroaryl, more preferably benzocondensed heteroaryl, particularly preferably benzothiazole, and $R^4$ is hydrogen and/or an optionally substituted straight chain, branched or cyclic, preferably saturated hydrocarbon radical with up to 12 carbon atoms, preferably a branched or cyclic alkyl radical with up to 6 carbon atoms, even more preferably cyclohexyl or tert.-butyl.

Preferred examples are sulphenamides which comprise a benzothiazole radical such as the CBS (N-cyclohexyl-2-benzothiazole sulphenamide) of formula

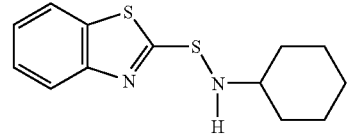

the DCBS (di-N-cyclohexyl-2-benzothiazole sulphenamide) of formula

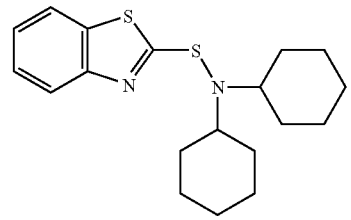

and the TBBS of formula

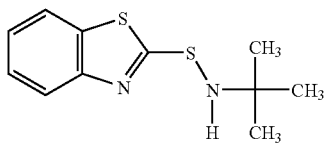

Suitable commercial products are listed in Chapter 5 "Accelerators" in the Rubber Handbook, 9th edition, 1996. The quantity of sulphenamide compound, which is used in combination with the dithiophosphate compound, is expediently 0.1 to 4 parts by weight, preferably 0.2 to 3 parts by weight, more preferably 0.5 to 2 parts by weight, based on 100 parts by weight of the diene elastomer.

The compositions obtained according to the present invention can also contain one or more benzothiazole compound(s) as the vulcanization accelerator in addition to the dithiophosphate. Benzothiazole compounds are compounds which comprise at least one benzothiazole radical which can optionally be substituted. According to the present invention the term "benzothiazole compounds" is to be taken to mean that it does not include any sulphenamide compounds according to the above definition. In other words, sulphenamide compounds are excluded according to the present invention from the scope of the benzothiazole compounds. Benzothiazole compounds of this type which do not include a sulphenamide group —S—NR$_2$ are, for example, mercaptobenzothiazoles and dibenzothiazolyl-disulphides, and preferred examples include alkylated mercaptobenzo-thiazoles and bis(alkylated benzothiazolyl)disulphides. Specific examples include mercaptobenzothiazole, 4-methylmercaptobenzothiazole, 4-ethylmercaptobenzothiazole, 2,2'-dithiobismercaptobenzothiazole, 2,2'-dithiobis(4-methylmercaptobenzothiazole), 2,2'-dithiobis(4-ethylmercapto-benzothiazole). A preferred representative is MBTS, 2,2'-dithiobis-[benzothiazole) of formula

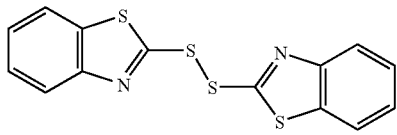

Further suitable commercial products are listed in Chapter 5 "Accelerators" in the Rubber Handbook, 9th edition, 1996. The quantity of the thiazole compound, which is used in combination with the dithiophosphate compound, is expediently 0.1 to 4 parts by weight, preferably 0.2 to 3 parts by weight, more preferably 0.5 to 2 parts by weight, based on 100 parts by weight of the diene elastomer.

The compositions obtained according to the present invention preferably contain a sulphenamide compound as defined above.

The compositions obtained according to the present invention can contain additional components conventionally used in diene rubber mixtures that can be crosslinked with sulphur and which are provided for producing tires, such as plasticizers, pigments, protective agents, such as antioxidants and antiozonants, further crosslinking systems based on peroxide and/or bismaleimides, further vulcanization accelerators, vulcanization activators, extender oils and the like. The light-colored reinforcing filler can be combined with a conventional slightly reinforcing or non-reinforcing light-colored filler, for example clays, bentonite, talc, chalk, kaolin and titanium oxide. The compositions produced according to the present invention can also contain agents for coating the light-colored reinforcing filler or general auxiliaries for production which, as a result of an improvement in the dispersion of the light-colored filler in the rubber mixture or a reduction in the viscosity of the compositions in a known manner, improve their processability in the unvulcanized state, wherein these can, for example, be alkylalkoxysilanes (in particular alkyltriethoxy silanes), polyols, polyethers (for example polyethylene glycols), primary, secondary or tertiary amines, hydroxylated or hydrolysable polyorganosiloxanes, such as alpha,omega-dihydroxypolydiorganosiloxanes (in particular alpha,omega-dihydroxypolydimethylsiloxanes). The compositions produced according to the present invention can also contain additional coupling agents which are different from the polysulphide-containing alkoxysilanes. Conventional additives of this type are listed in the Rubber Handbook, 9th edition, 1996.

The present invention also relates to the rubber mixture which is obtainable by the process according to the invention and to the use of the rubber mixture for producing tires or semi-finished products for tires, such as treads, base layers for treads, crown layers, side walls, carcasses, tire beads, protectors, tubes or interiors for tubeless tires.

The present invention also relates to a process for producing crosslinked elastomer molded articles that include the introduction of the rubber mixtures produced according to the invention into a mold and subsequent vulcanization of the rubber mixture in the mold.

Vulcanization can be performed in a known manner at a temperature generally from 130 to 200° C. for a sufficiently long period of time which, for example, can be in the range of 5 to 90 min and depends, in particular, on the vulcanization temperature, the selected vulcanization system and the vulcanization kinetics of the respective composition.

The present invention also relates to the above-described rubber mixtures produced according to the invention in the crude state (i.e., before vulcanization) and also vulcanized (i.e., after crosslinking or vulcanization). The compositions produced according to the present invention can, of course, be used individually or in a blend with any other desired rubber mixtures that can be used for producing tires.

The present invention therefore also relates to the elastomer molded articles which are obtained by vulcanization of the rubber mixtures produced according to the invention and to the use of at least one dithiophosphate compound as the vulcanization accelerator for rubber mixtures containing activated light-colored filler.

EXAMPLES

Examples 1 and 2 Comparison Example 1

Rubber mixtures of the composition according to Table 1 were produced:

TABLE 1

|  | Examples | | | | Comparison example | |
|---|---|---|---|---|---|---|
|  | 1 | | 2 | | 1 | |
|  | phr[1] | g | phr | g | phr | g |
| Buna VSL 5025-0 HM[2] | 100 | 700 | 100 | 700 | 100 | 700 |
| Ultrasil 7000[3] | 50 | 350 | 50 | 350 | 50 | 350 |

TABLE 1-continued

|  | Examples | | | | Comparison example | |
|---|---|---|---|---|---|---|
|  | 1 | | 2 | | 1 | |
|  | phr[1] | g | phr | g | phr | g |
| Si-69[4] | 2.8 | 19.6 | 2.8 | 19.6 | 2.8 | 19.6 |
| Rhenogran TP-50[5] | 0 | 0 | 1 | 7 | 1 | 7 |
| ZnO | 2.5 | 27.5 | 2.5 | 17.5 | 2.5 | 17.5 |
| Stearic acid | 2 | 14 | 2 | 14 | 2 | 14 |
| 6PPD[6] | 1.9 | 13.3 | 1.9 | 13.9 | 1.9 | 13.9 |
| DPG[7] | 1.5 | 10.5 | 1.5 | 10.5 | 1.5 | 10.5 |
| Sulphur | 1.1 | 7.7 | 1.1 | 7.7 | 1.1 | 7.7 |
| CBS[8] | 2 | 14 | 2 | 14 | 2 | 14 |
| Rhenogran TP-50[5] | 2 | 14 | 2 | 14 | 0 | 0 |

[1]All quantities in "parts per hundred rubber"
[2]S-SBR, Bayer AG
[3]Silica, Degussa
[4][($C_2H_5O$)$_3$Si($CH_2$)$_3S_2$]$_2$ (TESPT) Degussa
[5]Zinc-di-n-butyl-dithiophosphate 50% in EPDM/EVA blue granules; Rhein Chemie Rheinau GmbH
[6]N-(1,3-dimethylbutyl)-N'-phenyl-p-phenylenediamine; Rhein Chemie Rheinau GmbH
[7]Diphenylguanidine; Bayer AG
[8]N-cyclohexyl-2-benzothiazole sulphenamide; Bayer AG The components were mixed as follows:

In a first pre-mixing stage, rubber, silica, alkoxysilane, dithiophosphate (comparison experiment), zinc oxide as the crosslinking activator, stearic acid as the activator for zinc oxide and 6PPD (anti-ageing agent, Rhein Chemie Rheinau GmbH) were mixed within 3.5 minutes at a starting temperature of 100° C. The mixture was left to cool and stored for 24 hours. The material was then mixed again for 1.5 minutes at a temperature of 100° C. and again left to cool.

These two mixing stages correspond to step a) of the invention.

In the third stage, the vulcanization accelerators and sulphur were added over 1.75 minutes and at 54° C. (ejection temperature 74 to 80° C.). This mixing stage corresponds to step b) of the invention.

The mixtures obtained were investigated in a rheometer.

The further physical data were determined using vulcanized samples, the duration of vulcanization generally being determined from the rheometer curve from T 90×1.5.

Table 2 shows the results obtained:

TABLE 2

|  | Example 1 | Example 2 | Comparison example 1 |
|---|---|---|---|
| Mixing viscosity/ML 1 + 4 [ME]/100° C. | 101 | 95 | 103 |
| MDR 160° C. | | | |
| T10 [min] | 2.33 | 2.21 | 3.23 |
| T50 [min] | 4.10 | 3.70 | 6.08 |
| T90 [min] | 8.49 | 7.30 | 14.72 |
| Smax (Nm) | 26.16 | 27.10 | 25.11 |
| Smin (Nm) | 2.9 | 2.67 | 2.81 |
| Vulcanization t-90 × 1.5 × 160° C. | | | |
| Tensile strength [MPa] | 15.60 | 15.66 | 16.76 |
| Elongation at break (D) [%] | 305 | 285 | 340 |

TABLE 2-continued

|  | Example 1 | Example 2 | Comparison example 1 |
|---|---|---|---|
| Tensile strength at 100% elongation (S100) [MPa] | 3.03 | 3.41 | 3.00 |
| Tensile strength at 200% elongation (S300) [MPa] | 8.14 | 9.29 | 7.66 |
| Shore A hardness, 23° C. | 72 | 72 | 71 |
| Shore A hardness, 60° C. | 70 | 70 | 67 |
| Rebound resilience 23° C. [%] | 13.8 | 13.6 | 14.2 |
| Rebound resilience 60° C. [%] | 54 | 54 | 53 |

(The measurements were taken, where present, by DIN/ISO methods, in particular ISO 1382 (see DIN-VDE-Taschenbuch Kautschuk und Elastomere 1, Beuth VDE Verlag 1985)).

In Examples 1 and 2, the results show an accelerating effect in the S-SBR mixture in scorching (t-10 value) and in complete vulcanization (t-90 value) as a result of the dithiophosphate content in the finished mixture.

The low Mooney viscosity value of Example 2 is an indicator of the coupling-activating function of the dithiophosphate. The increase in the degree of silanization is accompanied by a reduction in the mixture viscosity (=Mooney viscosity).

If, according to examples 1 and 2, dithiophosphates were used in the finished mixture as the accelerator, higher tensile strengths and Shore hardness values were achieved. The accelerator function of the dithiophosphates in the reduction of the tensile stress-elongation behavior compared with the comparison example can also be seen.

Examples 3 to 6 Comparison Example 1

The compositions illustrated in Table 3 were produced and investigated analogously to Examples 1 and 2.

TABLE 3

|  | Example 3 | Example 4 | Example 5 | Comparison example 2 |
|---|---|---|---|---|
| NR SMR 20[2] | 30.0 | 30.0 | 30.0 | 30.0 |
| BR Buna CB 24[3] | 40.0 | 40.0 | 40.0 | 40.0 |
| L-SBR Buna VSL 5025-0[4] | 30.0 | 30.0 | 30.0 | 30.0 |
| Ultrasil 7000 GR[5] | 80.0 | 80.0 | 80.0 | 80.0 |
| Si 69[6] | 7.5 | 7.5 | 7.5 | 7.5 |
| Statex N 115[7] | 10.0 | 10.0 | 10.0 | 10.0 |
| Stearic acid | 2.0 | 2.0 | 2.0 | 2.0 |
| Zinc flowers RS (ZnO) | 3.0 | 3.0 | 3.0 | 3.0 |
| Aktiplast ST[8] | 4.0 | 4.0 | 4.0 | 4.0 |
| Antilux 654[9] | 2.0 | 2.0 | 2.0 | 2.0 |
| Vulkanox HS (TMQ)[10] | 2.0 | 2.0 | 2.0 | 2.0 |
| Vulkanox 4020 (6PPD)[11] | 2.0 | 2.0 | 2.0 | 2.0 |
| Viatec 500 (TDAE oil)[12] | 8.0 | 8.0 | 8.0 | 8.0 |
| Sulphur | 2.0 | 2.0 | 2.0 | 2.0 |
| Vulkacit CZ (CBS)[13] | 2.0 | 2.0 | 2.0 | 2.0 |

TABLE 3-continued

|  | Example 3 | Example 4 | Example 5 | Comparison example 2 |
|---|---|---|---|---|
| Rhenogran DPG-80[14] | — | — | — | 2.0 |
| Rhenogran SDT-50[15] | — | — | — | — |
| Rhenogran TP-50[16] | 2.0 | — | — | — |
| Rhenogran ZBOP-50[17] | — | 2.0 | — | — |
| Rhenogran ZDT-50[18] | — | — | 2.0 | — |

[1] All quantities in "parts per hundred rubber"
[2] Natural rubber SMR 20 (SMR = quality standard "Standard Malaysian Rubber")
[3] Butadiene rubber, Bayer AG
[4] SBR solution vinyl-butadiene-styrene rubber, Bayer AG
[5] Silica, Degussa
[6] $[(C_2H_5O)_3Si(CH_2)_3S_2]_2$, (TESPT) Degussa
[7] Carbon black, Columbian Chemicals
[8] Mixture of hydrocarbons, Zn soaps and fillers, Rhein Chemie Rheiau GmbH
[9] Paraffins and microwaxes with average molecular weight distribution, Rhein Chemie Rheinau
[10] Anti-ageing agent TMQ (Vulkanox HS), Bayer
[11] Anti-ageing agent 6PPD (Vulkanox 4020), Bayer
[12] TDAE (Treated Distillate Aromatic Extract) oil
[13] N-cyclohexyl-2-benzothiazolesulphenamide; Bayer AG
[14] N,N'-diphenylguanidine in EPDM/EVA (80%)
[15] Phosphorylpolysulphide in EPDM/EVA (50%), Rhein Chemie Rheinau GmbH
[16] Zincdialkyldithiophosphates in EPDM/EVA (50%) blue granules, Rhein Chemie Rheinau GmbH
[17] Zincdialkyldithiophosphates in EPDM/EVA (50%) beige granules, Rhein Chemie Rheinau GmbH
[18] Zincdialkyldithiophosphates in EPDM/EVA (50%) beige granules, Rhein Chemie Rheinau GmbH.

Table 4 shows the results:

TABLE 4

|  |  | Example 3 | Example 4 | Example 5 | Comparison example 2 |
|---|---|---|---|---|---|
| Mooney viscosity 100° C. | ME | 79 | 80 | 81 | 76 |
| MDR 2000 | 190° C. |  |  |  |  |
| t-90 | min | 1.14 | 1.24 | 1.29 | 1.04 |
| Smax | Nm | 26.12 | 26.69 | 26.65 | 26.79 |
| Smin | Nm | 2.78 | 2.78 | 3.11 | 2.28 |
| Reversion 190° C. | % | 93.7 | 96.8 | 98.3 | 84.4 |
| Reversion 170° C. (Torque after 30 min in %) Vulcanization t-90 × 1.5/170° C. | % | 95 | 99.5 | 97.6 | 86.4 |
| Tensile strength | Mpa | 16.9 | 17.9 | 16.8 | 18.9 |
| Elongation at break | % | 256 | 269 | 256 | 297 |
| Tensile strength at 100% elongation | Mpa | 4.5 | 4.4 | 4.2 | 4.2 |
| Tensile strength at 200% elongation | Mpa | 12.3 | 12.2 | 11.8 | 11.5 |
| Hardness 23° C. | Shore A | 72.5 | 73 | 72.1 | 72.9 |
| Hardness 70° C. | Shore A | 69.9 | 70.2 | 69.5 | 70.5 |
| Rebound elasticity 23° C. | % | 47.2 | 47.4 | 47.2 | 46.2 |
| Rebound elasticity 70° C. | % | 63.5 | 63.1 | 63 | 61.7 |
| Abrasion | mm3 | 111 | 118 | 113 | 111 |
| Flexometer test/Goodrich |  |  |  |  |  |
| Permanent deformation | % | 2.6 | 2.5 | 2.6 | 5.1 |
| Flow | % | 0.5 | 0.5 | 0.5 | 2.9 |
| delta T after 25 min | ° C. | 35.5 | 36.1 | 35.6 | 38 |
| Puncture temperature | ° C. | 142 | 143 | 143 | 150 |
| Dynamic properties/10 Hz |  |  |  |  |  |
| E' 70° C. | Mpa | 5.43 | 5.67 | 4.62 | 5.48 |
| E" 70° C. | Mpa | 0.45 | 0.44 | 0.39 | 0.45 |
| tan-d 70° C. |  | 0.083 | 0.0791 | 0.0864 | 0.0817 |
| E' 23° C. | Mpa | 9.74 | 9.79 | 7.64 | 8.64 |
| E" 23° C. | Mpa | 1.32 | 1.25 | 1.04 | 1.09 |
| tan-d 23° C. |  | 0.136 | 0.129 | 0.136 | 0.127 |
| E' 0° C. | Mpa | 14.3 | 14.2 | 10.3 | 12.6 |
| E" 0° C. | Mpa | 2.73 | 2.59 | 2.02 | 2.35 |
| tan-d 0° C. |  | 0.192 | 0.183 | 0.195 | 0.187 |

(The measurements were taken, where present, by DIN/ISO methods, in particular ISO 1382 (see DIN-VDE-Taschenbuch Kautschuk und Elastomere 1, Beuth VDE Verlag 1985)).

Table 4 shows the following:

With dithiophosphates as the accelerator more reversion-stable NR-containing silica-containing mixtures (reversion index at 170 and 190° C.) may be produced compared with the standard (comparison example 2 with DPG). More thermally stable mixtures (heat build-up/Goodrich Flexometer) compared with the standard may be produced with dithiophosphates. Dithiophosphates improve the anti-skid behavior compared with the standard (indicator higher tan-d value at 0° C.). Dithiophosphates exhibit higher elasticity compared with the standard (indicator of tire comfort). Hardness, abrasion and rolling resistance (indicator tan-d value 70° C.) are unchanged by dithiophosphates compared with the standard. The tensile stress/elongation behavior deteriorates compared with the standard as a result of dithiophosphates.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A process for producing a rubber mixture comprising:
   a) reacting at least one diene elastomer, at least one light-colored reinforcing filler, at least one dithiophosphate compound and at least one polysulfide-containing alkoxysilane, thereby forming a composition, and
   b) mixing the composition of step a) with at least one vulcanizing agent, at least one further dithiophosphate compound and at least one further vulcanization accelerator selected from the group consisting of a sulfenamide compound and a thiazole compound.

2. The process according to claim 1, wherein the diene elastomer comprises at least one solution SBR.

3. The process according to claim 1, wherein the light-colored reinforcing filler comprises silica.

4. The process according to claim 1, wherein the polysulfide-containing alkoxysilane comprises at least one bisalkoxysilyl alkyl polysulfide.

5. The process according to claim 1, wherein the vulcanizing agent comprises sulfur.

6. The process according to claim 1, wherein the dithiophosphate compound and the further dithiophosphate compound is selected from compounds of following formulae

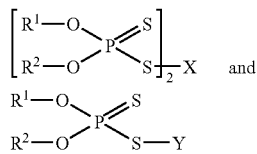

wherein $R^1$ and $R^2$, respectively independently of each other are an optionally substituted $C_1$ to $C_{10}$ alkyl group and/or an optionally substituted $C_6$ to $C_{10}$ aryl group, X is a bifunctional radical and Y a monofunctional radical wherein X and Y each, independently, comprise at least one atom other than carbon.

7. The process according to claim 1, wherein the dithiophosphate compound and the further dithiophosphate compound is selected from compounds of following formulae

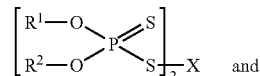

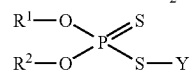

wherein $R^1$ and $R^2$, respectively independently of each other are an optionally substituted $C_1$ to $C_{10}$ alkyl group and/or an optionally substituted $C_6$ to $C_{10}$ aryl group, X is Zn, and Y is a monofunctional radical wherein Y comprises at least one atom other than carbon.

8. The process according to claim 1, wherein the additional vulcanization accelerator is a sulfenamide compound.

9. The process according to claim 1, wherein the sulfenamide compound is cyclohexyl benzothiazole sulfenamide (CB), butylbenzothiazole sulfenamide (TBBS), dicyclohexyl benzothiazole sulfenamide (DCBS), or mixtures thereof.

10. The process according to claim 1, further comprising:
    heating, during said reacting step a), the at least one diene elastomer, the at least one light-colored reinforcing filler, the at least one dithiophosphate compound and the at least one polysulfide-containing alkoxysilane to a temperature of at least 130° C.

11. The process according to claim 10, wherein said heating is for a period of between 30 seconds and 30 minutes.

12. The process according to claim 11, further comprising:
    cooling the composition of step a) to less than 120° C. before said mixing step b).

13. The process according to claim 12, further comprising:
    further heating, after said cooling, the composition of step a) to a temperature of at least 130° C.

14. A process for producing a crosslinked elastomer molded article, comprising:
    preparing a rubber mixture by:
    a) reacting at least one diene elastomer, at least one light-colored reinforcing filler, at least one dithiophosphate compound and at least one polysulfide-containing alkoxysilane, thereby forming a composition, and
    b) mixing the composition of step a) with at least one vulcanizing agent, at least one further dithiophosphate compound and at least one further vulcanization accelerator selected from the group consisting of a sulfenamide compound and a thiazole compound; subsequently introducing the rubber mixture into a mold; and vulcanizing the rubber mixture in the mold.

15. The process according to claim 14, further comprising:
    heating, during said reacting step a), the at least one diene elastomer, the at least one light-colored reinforcing filler, the at least one dithiophosphate compound and the at least one polysulfide-containing alkoxysilane to a temperature of at least 130° C.

16. The process according to claim 15, wherein said heating is for a period of between 30 seconds and 30 minutes.

17. The process according to claim 16, further comprising:
    cooling the composition of step a) to less than 120° C. before said mixing step b).

18. The process according to claim 17, further comprising:
    further heating, after said cooling, the composition of step a) to a temperature of at least 130° C.

* * * * *